United States Patent
Mossoba et al.

(10) Patent No.: US 12,405,720 B2
(45) Date of Patent: Sep. 2, 2025

(54) SCROLL-BASED AUTOMATIC FIELD COMPLETION

(71) Applicant: Capital One Services, LLC, McLean, VA (US)

(72) Inventors: Michael Mossoba, Great Falls, VA (US); Timur Sherif, Silver Spring, MD (US); Lesley Newton, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 959 days.

(21) Appl. No.: 17/530,279

(22) Filed: Nov. 18, 2021

(65) Prior Publication Data
US 2023/0153650 A1     May 18, 2023

(51) Int. Cl.
*G06F 3/0485* (2022.01)
*G06F 40/174* (2020.01)
*G06N 5/04* (2023.01)

(52) U.S. Cl.
CPC .......... *G06F 3/0485* (2013.01); *G06F 40/174* (2020.01); *G06N 5/04* (2013.01)

(58) Field of Classification Search
CPC ............. G06F 3/04842; G06F 3/04855; G06F 40/174; G06F 3/0485; G06N 5/04; G06N 3/09; G06N 7/01; G06N 20/10; G06N 5/02; G06N 7/02
USPC ...................................................... 715/224
See application file for complete search history.

(56) References Cited

U.S. PATENT DOCUMENTS

| | | | |
|---|---|---|---|
| 6,662,340 B2 | 12/2003 | Rawat et al. | |
| 7,644,351 B1 | 1/2010 | Portnoy et al. | |
| 7,660,779 B2 | 2/2010 | Goodman et al. | |
| 7,849,398 B2 | 12/2010 | Dabet et al. | |
| 8,234,561 B1 | 7/2012 | Bourdev | |
| 10,140,277 B2 | 11/2018 | Unsal | |
| 10,606,916 B2 | 3/2020 | Brannon et al. | |
| 10,635,692 B2 | 4/2020 | Eigner et al. | |
| 11,049,190 B2 | 6/2021 | Mukherjee et al. | |
| 11,475,214 B1 * | 10/2022 | Chacko | G06F 40/174 |
| 2005/0183003 A1 | 8/2005 | Peri | |
| 2006/0168509 A1 | 7/2006 | Boss et al. | |
| 2008/0082909 A1 | 4/2008 | Zuverink et al. | |
| 2008/0120257 A1 | 5/2008 | Goyal et al. | |
| 2008/0267505 A1 * | 10/2008 | Dabet | G06V 30/412 382/187 |
| 2011/0271173 A1 | 11/2011 | Ait-Mokhtar et al. | |
| 2014/0129914 A1 | 5/2014 | Agarwal | |

(Continued)

*Primary Examiner* — Matthew Ell
*Assistant Examiner* — Alvaro R Calderon, IV
(74) *Attorney, Agent, or Firm* — Foley & Lardner LLP

(57) ABSTRACT

Scroll-based automatic field completion is disclosed. A page displayed by a web browser can be monitored for empty fields as the page is scrolled. Automatic fill or completion of the empty field can be triggered in response to a request to scroll down based on the location of the empty field on the page. Automatic completion can involve determining a type of data associated with the field and retrieving user data of the type from a data store. A machine learning model can also be invoked to predict a user's preference for multiple completion options. Further, automatic refill of a completed field with different information can be initiated in response to a scroll up and the location of the field on the page.

20 Claims, 8 Drawing Sheets

(56) References Cited

U.S. PATENT DOCUMENTS

| | | | |
|---|---|---|---|
| 2015/0074588 A1* | 3/2015 | Swinehart | G06F 3/04812 |
| | | | 715/780 |
| 2016/0283070 A1* | 9/2016 | AbiEzzi | G06F 9/452 |
| 2017/0046325 A1* | 2/2017 | Jitkoff | G06F 16/9577 |
| 2018/0181555 A1* | 6/2018 | Nandi | G06F 3/0482 |
| 2020/0394259 A1* | 12/2020 | Onuma | G06F 17/18 |
| 2021/0027013 A1* | 1/2021 | Leme | G06F 40/174 |
| 2021/0103975 A1 | 4/2021 | Walters et al. | |

\* cited by examiner

SCROLL-BASED AUTOMATIC FIELD COMPLETION

BACKGROUND

E-commerce continues to grow at a rapid pace. Customers appreciate the availability and convenience offered by online shopping. Further, online shopping allows customers to compare pricing and find the best deals quickly. Forms on websites are frequently utilized to carry out many tasks, including completing an e-commerce transaction or applying for a credit card. These forms typically solicit information from users such as name and address (e.g., billing, shipping). Users can manually enter data into provided form fields.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to scroll-based automatic field completion. A displayed portion of a document, such as a web page, can be monitored as a scroll down is performed from the top to the bottom of the document. The presence of a field at a predetermined location in the displayed portion can be detected. In response to detecting a field, the field is analyzed to determine the type of data solicited. The corresponding data is then acquired, and the field is completed based on the data. A machine learning model can be invoked in the presence of uncertainty associated with multiple candidate completion options. The machine learning model seeks to predict or infer a user's preference based on information provided by the user and forms previously completed by the user, among other things, and identify the likelihood that the user would prefer each option. Subsequently, data is selected for use in completing a field based on the likely user preference. A user alert can be generated to request assistance from a user to complete a field or convey confidence scores associated with field completions. Further, the document can be monitored for scroll up from the bottom to the top of the document following a field completion, as such an action can be used to reject a field completion and request a different field completion. Where there are multiple field completion options, another option can be selected to complete the field. Consequently, a user can scroll down to trigger automatic field completion and scroll up at times to cycle through other completion options.

According to one aspect, a system is provided that comprises a processor coupled to a memory that includes instructions that, when executed by the processor, cause the processor to monitor display of a page by a web browser, identify an empty field at a location on the page, detect a request to scroll down, and trigger automatic completion of the empty field in response to the request to scroll down based on a location of the empty field on the page. In one instance, the instructions can further cause the processor to trigger the automatic completion when the field is displayed in the middle of the page or between the top and middle of the page. The instructions further cause the processor to analyze the empty field, determine a type of data, and retrieve data of the type from a data store. The instructions can further cause the processor to invoke a machine learning model to infer a preference for data when there are multiple data options to complete the empty field. The processor can also compute and return a confidence value associated with the data that completes the empty field. Further, the instructions can cause the processor to trigger automatic completion of a completed field with alternate data in response to a request to scroll up based on a location of the completed field on the page. The instructions further cause the processor to trigger the automatic completion of the completed field within a predetermined time from when the field was completed.

According to another aspect, a method is provided comprising monitoring display of a page by a web browser, identifying an empty field at a location on the page, detecting a request to scroll down, and triggering an automatic fill of the field in response to the request to scroll down based on a location of the field on the page. The method further comprises triggering an automatic refill of the field with different data in response to a request to scroll up and the location of the field on the page, and in one instance triggering the automatic refill of the field within a predetermined time from when the field was filled. Further, the method comprises presenting different refill options for selection by a user in response to a request to scroll up and the location of the field on the page. The method can further comprise analyzing the field, determining a type of data solicited, and retrieving data of the type solicited from the data store. Furthermore, the method can invoke a machine learning model to infer a preference for data when there are multiple data options to complete the empty field and fill the field with one of the multiple data options based on the preference.

In accordance with another aspect, a method of completing a field automatically is disclosed that executes, on a processor, instructions that cause the processor to perform operations. The operations comprise identifying a field displayed on a page by a web browser in response to a scroll down request, determining a type of data associated with the field, retrieving user data of the type from a data store, and automatically filling the field with the user data. The operations can further comprise invoking a machine learning model to infer a user preference when multiple user data options are available, and automatically filling the field with one of the multiple user data options based on the user preference. Further, the operations include determining a level of confidence associated with the user data that filled the field and rendering a level of confidence on the page associated with the field. The operations further comprise refilling the field with a different user data option in response to a scroll-up request within a predetermined time of the field being filled.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Web pages often solicit information from a user for various purposes by way of fields. Fields or input elements are interactive controls that accept data from a user. There are several types of fields, including text boxes, dropdown menus, and checkboxes. Users can type text in a text box, select an option from a dropdown menu, or tick a checkbox to provide solicited user information, such as name, address, credit card number, and agreement to terms, among other things. Typically, such information is manually provisioned by a user, which can be time-consuming.

Details disclosed herein generally pertain to scroll-based automatic field completion. A visible area of a document or web page is monitored for empty fields at a predetermined location. A scroll-down operation allows a user to view portions of a document from top to bottom. Such scrolling can reveal fields at the predetermined location. In response, automatic completion of the field is triggered. Consequently, as a user scrolls from the top to the bottom of a document, empty fields are completed or filled automatically in real-time. Continued scrolling can indicate consent and agreement with the automatically completed field. In cases of uncertainty, such as when multiple options are available to complete or fill a field, a machine learning model can be invoked to predict or infer a user preference based on past interaction and other contextual information. A field with multiple options can then be completed with an option predicted to be preferred by a user. A user alert can also be triggered when the system needs assistance completing a field or conveying completion confidence scores. Furthermore, a scroll-up can be utilized to revoke consent and disagree with an automatically completed field. In response, the field can be completed with a second option if multiple options exist. In this way, a user can cycle through potential completion options.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
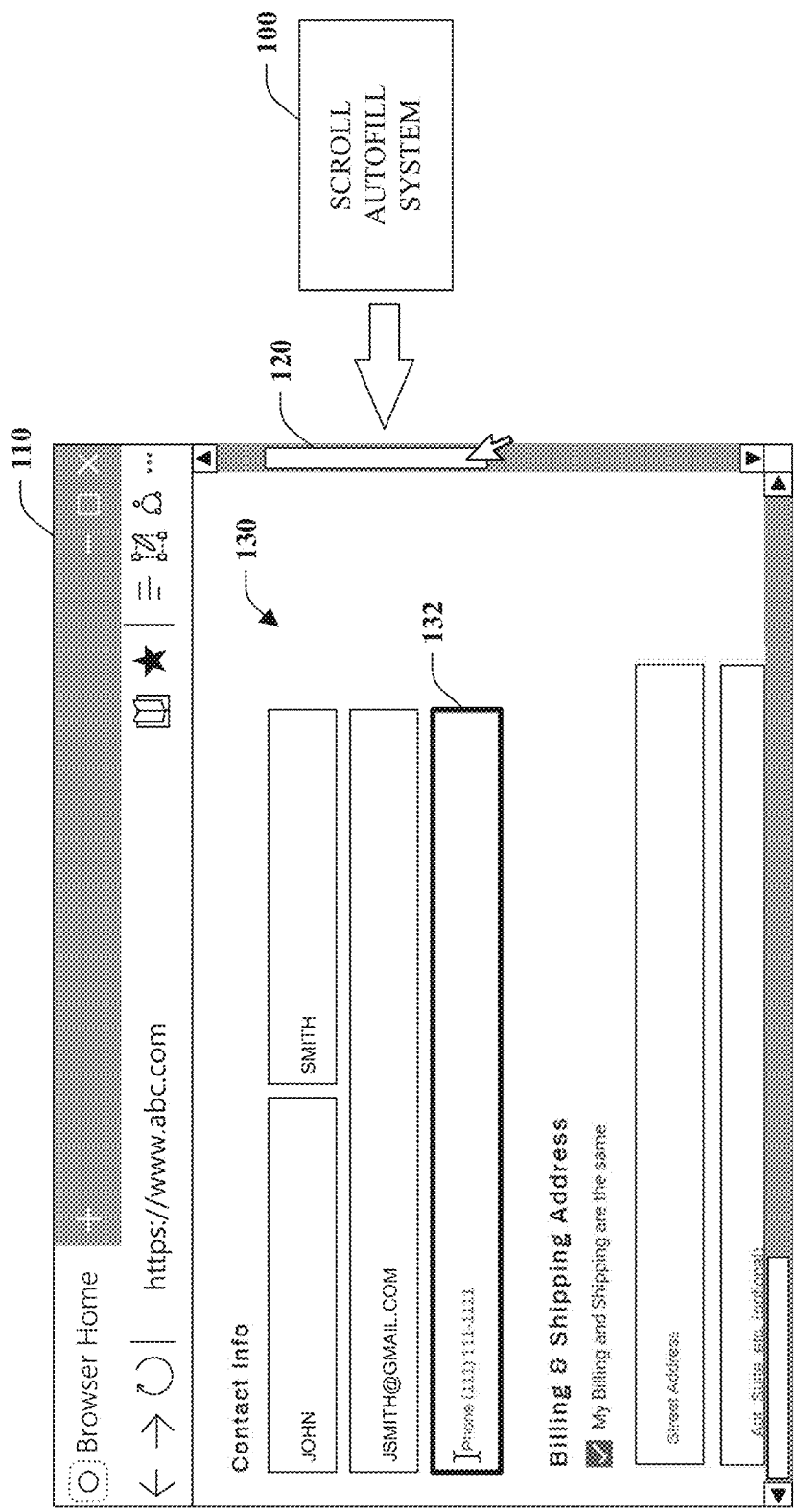
FIG. 1 illustrates an overview of an example implementation.

Referring initially to FIG. 1, a high-level overview of an example implementation is depicted. As shown, the implementation includes a scroll automatic fill system 100, a web browser 110, scroll bar 120, and form fields 132, including specific form field 132.

The automatic fill, or completion, system 100 is operable to monitor content presented by the web browser 110. More particularly, content can be monitored as a user interacts by scrolling through the page. A field, such as a form field, can be detected through the monitoring of presented content. The field can be detected at a position on a web page such as the top, middle, bottom, between top and middle, between middle and bottom, or other locations. Automatic completion or filling a field can be triggered after detecting the field at a position during scrolling. The completion can involve determining data solicited by the field, locating or inferring the data solicited, and filling or otherwise completing the field with the data.

The web page content displayed by the web browser 110 includes numerous form fields 130 for completion. The content is segmented into contact information, billing, and shipping address. The user can interact with the scroll bar 120 to scroll up and down the page. In this embodiment, the scroll automatic fill system 100 can be triggered when a field is displayed in the center of the web browser 110 page. The first name, last name, and email address in the contact information section have already been completed by the scroll automatic fill system 100. The phone number field 132 is positioned in the middle of the display, which triggers the scroll automatic fill system 100. The scroll autofill system 100 will detect the field, determine that the solicited data is a user's phone number, acquire the phone number from a data store, and complete or fill the field with the requested phone number. Billing and shipping section fields, including the street address, remain unfilled until they reach the center of the display, like the phone number field 132. Here, scrolling down a page triggers automatic completion. However, scrolling left to right or right to left can also trigger automatic completion when the orientation of the fields is horizontal instead of or in addition to vertical. Of course, automatic completion can be triggered with a combination of vertical and horizontal scrolling.

In one instance, scrolling in the opposite direction for triggering completion can change the field. For example, when scrolling down, an address field can be completed with a first address. However, if a user scrolls back up after completion, the field's value can change from a first address to a second address. For example, the first address can be a home or primary address, and the second address could be a vacation home or work address. The field can be initially filled with a home address, but the user may want to use the vacation home address, so they would scroll up to trigger a refill with the vacation address.

A portion of data for filling fields can be static and known with a high degree of confidence. For example, a user's name is static and known. Another portion of data can be variable but with a fixed set of options, such as home and work address. Yet portions can be variable and preferential. In other words, the portion is associated with a user preference. For example, a field can relate to shipping method (e.g., standard, ground, next day air . . . ) and the corresponding cost. Completing a field can simply correspond to receiving the data from a data store for known static data. For preferential data, a machine learning model associated with a user can be invoked to identify particular data as candidates to complete a field. The candidate with the highest likelihood of being a user's choice can be selected in one instance. Further, fields filled with preferential or predictive data can be identified as such, and optionally, the probability associated with the data can be presented with the data. Further, an upward scroll after completion can result in replacement of the data with another candidate. The top few candidates can be presented for selection in an overlaid dropdown menu in one particular instance.

In a situation where the completion option is unknown or cannot be predicted within a threshold level of confidence, a user alert can be generated to request assistance. The user alert can request that the user manually complete the field. In one instance, the alert can prevent the user from scrolling momentarily by bouncing the screen up to the same spot. The alert can further be graphically indicated, for example, by highlighting the field or placing an encircled exclamation point next to the field.

Overall, the scroll automatic fill system 100 enables form field completion based on scrolling. As a user scrolls down a web page, fields can be detected and automatically filled in real-time or near real-time. Data used to populate a field can be collected directly during registration and by monitoring user interaction in the browser, such as completing other forms. Where there is uncertainty, a machine learning model can be invoked to identify data used to complete a field, or a user alert can be generated to request assistance. The user need only scroll down to fill the field and signify consent. The user can also scroll up to review a decision or revoke consent to the completion of the field. In some instances, a scroll up within a predetermined time can cause the field completion to change to an alternate value, other completion candidates can be presented for selection, or the user can manually enter the data.

Figure 2:
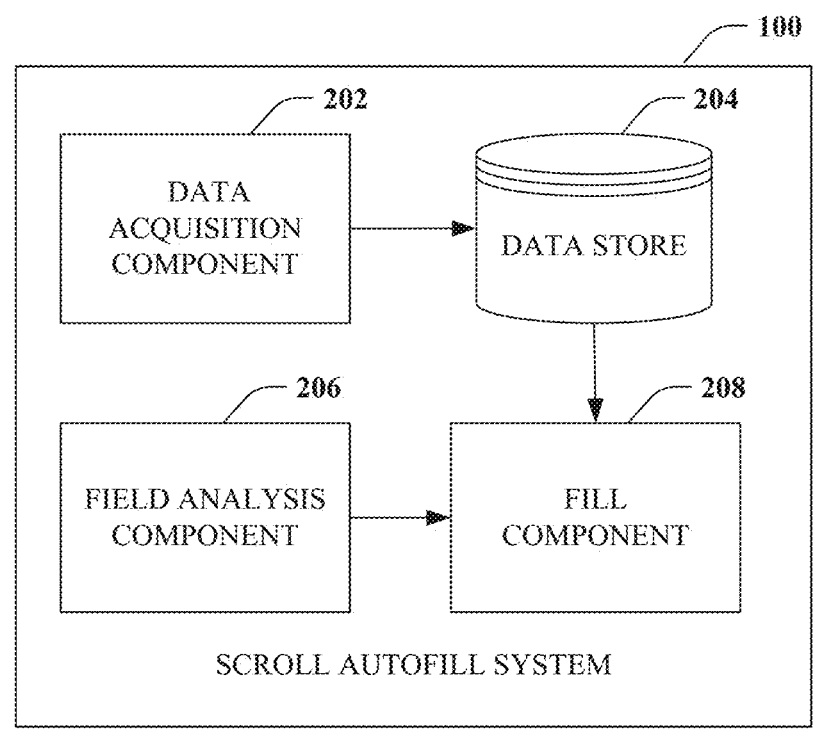
FIG. 2 is a block diagram of an example scroll autofill system.

Turning to FIG. 2, a block diagram of an example scroll autofill system 100 is illustrated. The system 100 includes data acquisition component 202, data store 204, field analysis component 206, and fill component 208. The data acquisition component 202, field analysis component 206, and fill component 208 can be implemented by a processor coupled to a memory that stores instructions that cause the processor to perform the functionality of each component when executed. Consequently, a computing device can be configured to be a special-purpose device or appliance that implements the functionality of the system 100. Further, portions of the system 100 can be distributed across computing devices or made accessible by way of a network service. The data store 204 corresponds to a persistent store that saves and makes data available to components of the system 100. The data store can be local or remote with the components and can be distributed across devices.

The data acquisition component 206 is operable to receive, retrieve, or otherwise obtain or acquire data regarding a user of a computing device. In one instance, information can be requested from a user as part of an onboarding or registration process before initiating scroll-based automatic completion. For example, a user's name, address, and phone number can be requested. Further, the data acquisition component 206 can acquire data by monitoring a user's interactions with a computing device and applications executing on the device, such as a web browser, with the user's permission. Data acquired directly or indirectly from a user can be saved to the data store 204. Further, the acquisition component 206 can aggregate data, generate new data, or update data as new information becomes available. For example, if it can be inferred that an individual has moved, the home address can be updated to reflect the new address.

The field analysis component 206 is operable to detect the presence of a field and determine or infer data solicited by the field. The field analysis component 206 can detect the presence of a field at a predetermined location. For example, the field analysis component 206 can detect a field that has moved to the center of the viewing area through a scroll action. The data solicited by the field, or, in other words, the field data type, can then be determined by the field analysis component 206.

Figure 3:
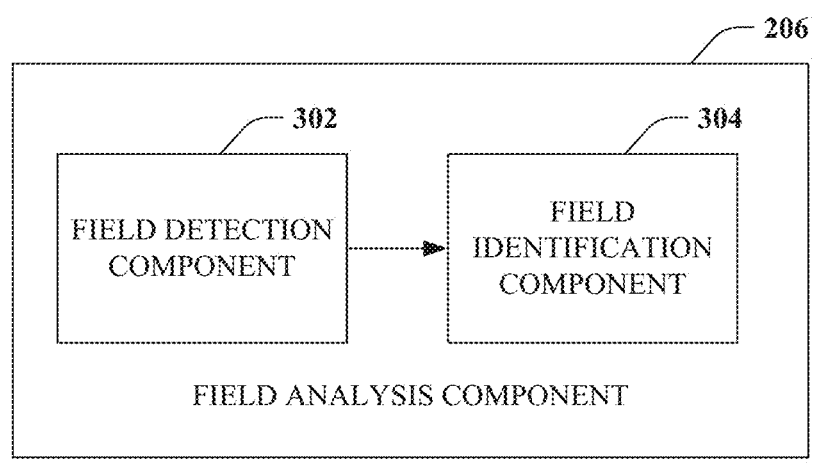
FIG. 3 is a block diagram of an example field analysis component.

Turning attention briefly to FIG. 3, an example field analysis component 206 is illustrated in further detail. Here, the field analysis component 206 includes a field detection component 302 and a field identification component 304.

The field detection component 302 is operable to monitor the display of content in a viewable area. For example, the presentation of web page content by a web browser can be monitored. The monitoring can seek to detect or identify the presence of a fillable field at a particular location. The location can be predetermined and configurable. For example, location can be the top, middle, bottom, between the top and the middle, or between the middle and the bottom of the viewable area. The content, including the presence of a fillable field, can change a scroll action is performed. The field detection component 302 can detect the presence or absence of a field at the location in real or near real-time in response to scrolling.

The field identification component 304 is operable to receive a signal from the field detection component 302 that indicates the presence of a fillable field in a particular location. In response, the field identification component analyzes the field and context data surrounding the field to determine what data is solicited by the field or, in other words, the field data type. For example, a field can request first name, last name, billing address, shipping address, shipping preference, birthday, social security number, or credit card number, among other things. The field identification component 304 can acquire and analyze a field to determine the field's data type. In one instance, underlying web page code can be analyzed to determine a field data type based on the code and metadata surrounding a field. In another instance, displayed content can be employed to determine a field data type. For example, a field can include information in the field itself, perhaps in light gray, that can aid identification of field data type. For example, in FIG. 1, field 132 includes "Phone (111) 111-1111," which identifies the data type as a phone number.

Returning to FIG. 2, the fill component 208 receives the field type from the field analysis component 206. Stated differently, the fill component 208 receives information regarding data solicited from a fillable field, such as name, address, phone number, or payment information. The fill component 208 is operable to complete or fill the field automatically. In a simple scenario, the fill component 208 can query the data store 204 for user data requested. After the data is returned in response to the query, the fill component 208 can then utilize the data to fill or otherwise complete the field. In more complex scenarios, the fill component 208 can determine or infer user data to fill the field. In cases of uncertainty, a user may be alerted or otherwise notified that the fill component 208 needs assistance to fill a field.

Figure 4:
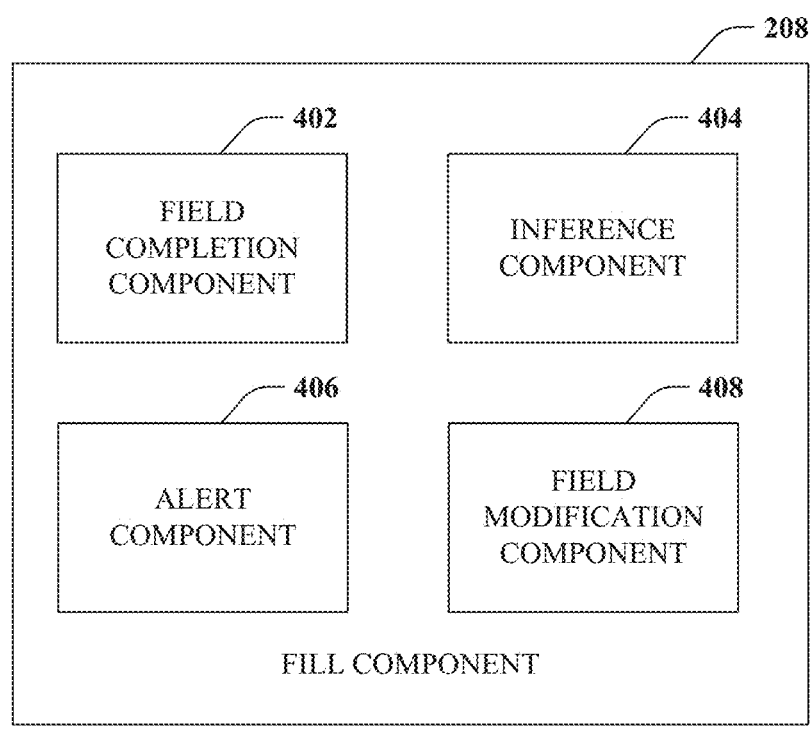
FIG. 4 is a block diagram of an example fill component.

FIG. 4 depicts an example fill component 208 in further detail. The fill component 208 includes field completion component 402, inference component 404, alert component 406, and field modification component 408. These subcomponents can also correspond to computer-executable components that include instructions that, when executed by a processor, cause the processor to perform the functionality of the fill component 208.

The field completion component 402 is operable to complete a field automatically based on corresponding data. Various field types exist, including text boxes and checkboxes, and the field completion component is operable to interact with the various types. For example, a field associated with first name and last name can be completed by automatically entering a user's first and last names in corresponding text boxes. Where the field corresponds to a checkbox, the checkbox can be checked or unchecked based on evaluation of data associated with a condition of the checkbox. For instance, a checkbox can list a number of ethnicities (e.g., White, Asian, Hispanic, Pacific Islander . . . ), and the checkbox associated with a user's ethnicity can be checked while others are unchecked. Likewise, suppose the field includes a dropdown menu. In that case, a menu option can be selected based on the evaluation of data associated with the field data type and the menu options, such that the menu option that matches the data is selected.

The inference component 404 is operable to infer user data and preferences to complete fields. In one embodiment, the inference component 404 can comprise or invoke a machine learning model to aid in field completion in situations where there is uncertainty. A machine learning model can be trained based on user interactions and contextual information surrounding the interaction. The machine learning model can thus learn user preferences that can be exploited to complete fields. For example, it can be predicted or otherwise inferred that a shipping address should be to a user's beach house rather than primary residence based on the time of year, previous trips, and/or the item purchased, among other things. As another example, selecting a shipping option, such as standard five-day ground or next day air, can be determined based on cost, past preference, and recent other items purchased and their shipping option, among other things.

In one instance, the inference component 404 can assign probabilities to candidate fill options. The probability captures the likelihood that a user would prefer candidate fill options. The candidate with the highest probability can be used to complete a field. Alternatively, the top-N candidate fill options can be selected and presented to a user for selection, for example, in a dropdown menu overlaid on the form field.

The alert component 406 is operable to alert or notify a user. In one instance, the alert component 406 can request assistance in completing an empty field when the completion is unknown or cannot be predicted within a threshold confidence level. In another instance, the alert can notify the user that a field completion was predicted and the confidence level associated with the prediction.

Concerning requesting assistance, the alert component can prevent the user from scrolling momentarily, for instance, by bouncing the screen up in response to a scroll-down request. Further, the graphical elements can be added as part of the alert. For example, a field that requires completion can be highlighted, or an encircled exclamation mark icon can be overlaid on the document and positioned next to the field. The field can remain unfilled until a user manually completes the field. Scrolling can be re-engaged after the field is completed, and the response can be saved to improve future automatic completion.

As per notification, the alert can graphically notify the user regarding how the field was completed and convey a confidence score associated with the completion. For example, if there is uncertainty regarding how to complete a field by field completion component 402, the alert component 406 can be triggered. An alert can inform the user that the field was completed based on probabilistic reasoning and prompt the user to scrutinize the field more closely and potentially manually override the automatic completion.

The field modification component 408 is operable to detect a desire to alter an automatically generated field completion and provide an alternative completion. As a user scrolls down a page of content, Tillable fields are completed automatically. The user can view the completions and, if acceptable, continue to scroll down. If the user disagrees with the completion, the user could scroll up within a predetermined time after completion. The scroll-up action can trigger the field modification component 408, which can clear the field and initiate field completion with a different value. For example, if a street address field is completed with a home address, a user can scroll up to remove the home address and replace the address with a vacation home or business address. Available fill options can be cycled through with different scroll up and down operations. Alternatively, a list of options can be presented to the user to select from, or the user could manually enter the value. In the case of manual entry, automatic text completion can be employed. As a user types, text matching options can appear that can be selected to avoid entering all the alphanumeric characters.

The scroll automatic fill system 100 can automatically complete form or Tillable fields as a user scrolls through the content of a web page, for instance. More specifically, the completion can be performed once a field is present at a particular position of a display (e.g., top, middle, bottom . . . ). To provide a real-time completion experience, the system 100 can look ahead and determine how the field will be completed before the field reaches the particular position. When the user does reach the position, the fill can be completed expeditiously. For example, a field can be detected when it reaches the top of a display, the field can be analyzed to determine data type, and a candidate completion can be identified for the field data type. Subsequently, when the field reaches the middle of a display due to scrolling, the candidate completion can be used to complete the field. Of course, all or a subset of fields can be evaluated earlier, such as at page load time, and output field completions as a user scrolls through the content. Regardless, scroll to complete provides a semi-passive manner of field completion.

Although not limited thereto, the scroll automatic fill system 100 can be implemented as a browser extension for desktop and mobile computing devices. A user with a web browser can navigate to a web page. The browser extension can then detect if the page has empty fields (e.g., text boxes, checkboxes, buttons, dropdowns . . . ). The extension can exploit data on file about a user from previously completed forms and use machine learning to predict preference in the presence of uncertainty. The user simply scrolls down to automatically complete fields and signify consent (e.g., do you agree to the terms of service). The user can scroll up to review a decision, make a change, or revoke consent.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the fill component 208, and more specifically the inference component 404, can utilize such mechanisms to predict or infer user preferences in view of uncertainty concerning fill options.

Figure 5:
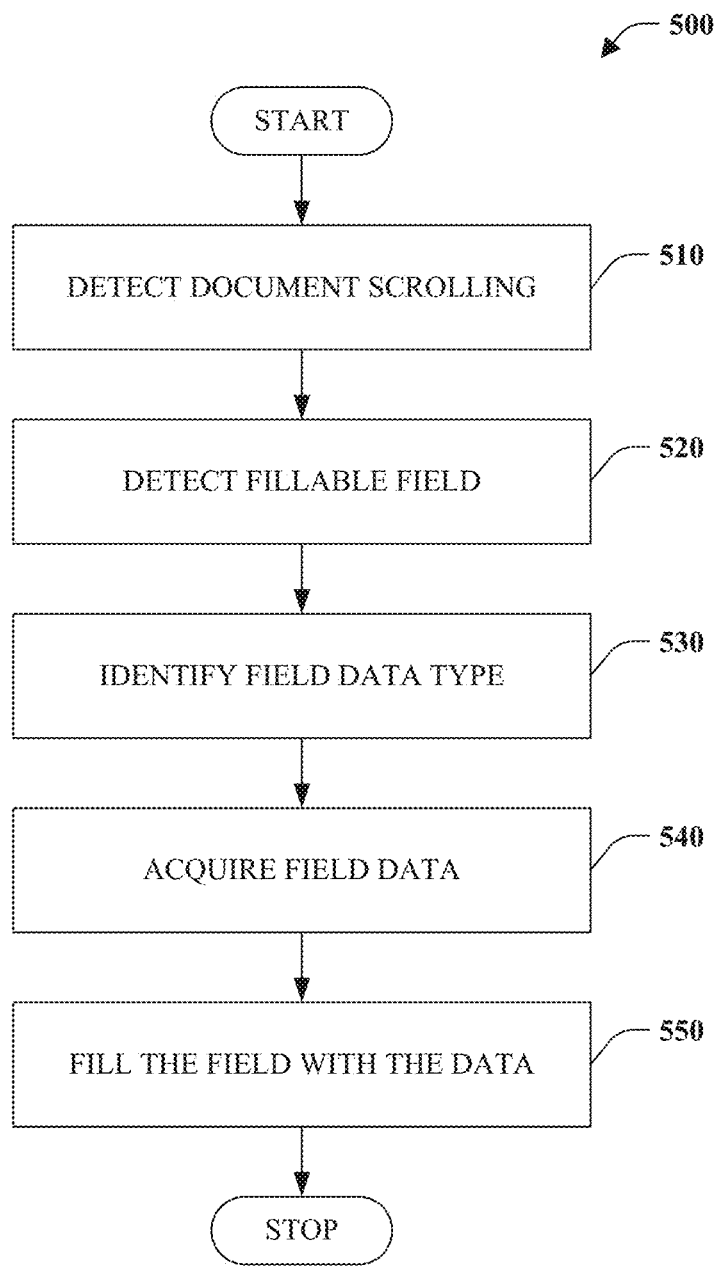
FIG. 5 is a flow chart diagram of a method of scroll-based automatic field completion
Figure 6:
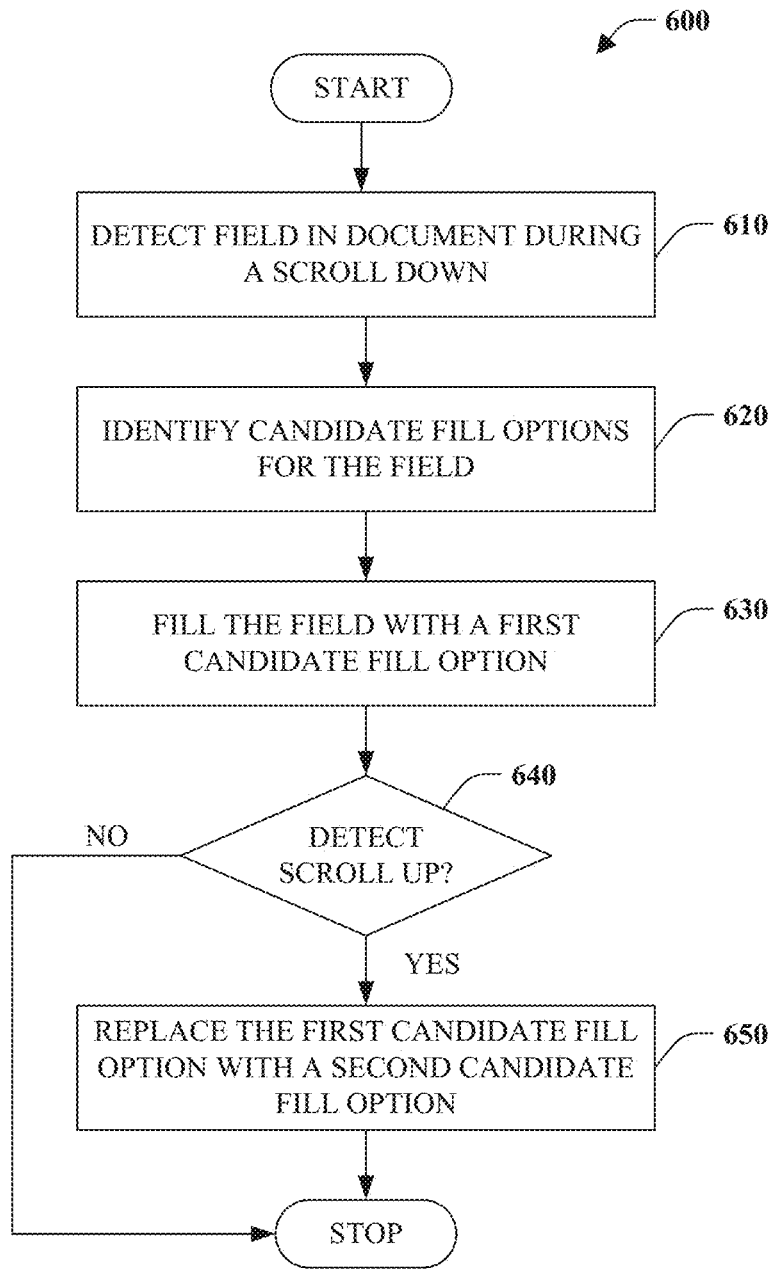
FIG. 6 is a flow chart diagram of a method of scroll-based automatic field completion and alteration.
Figure 7:
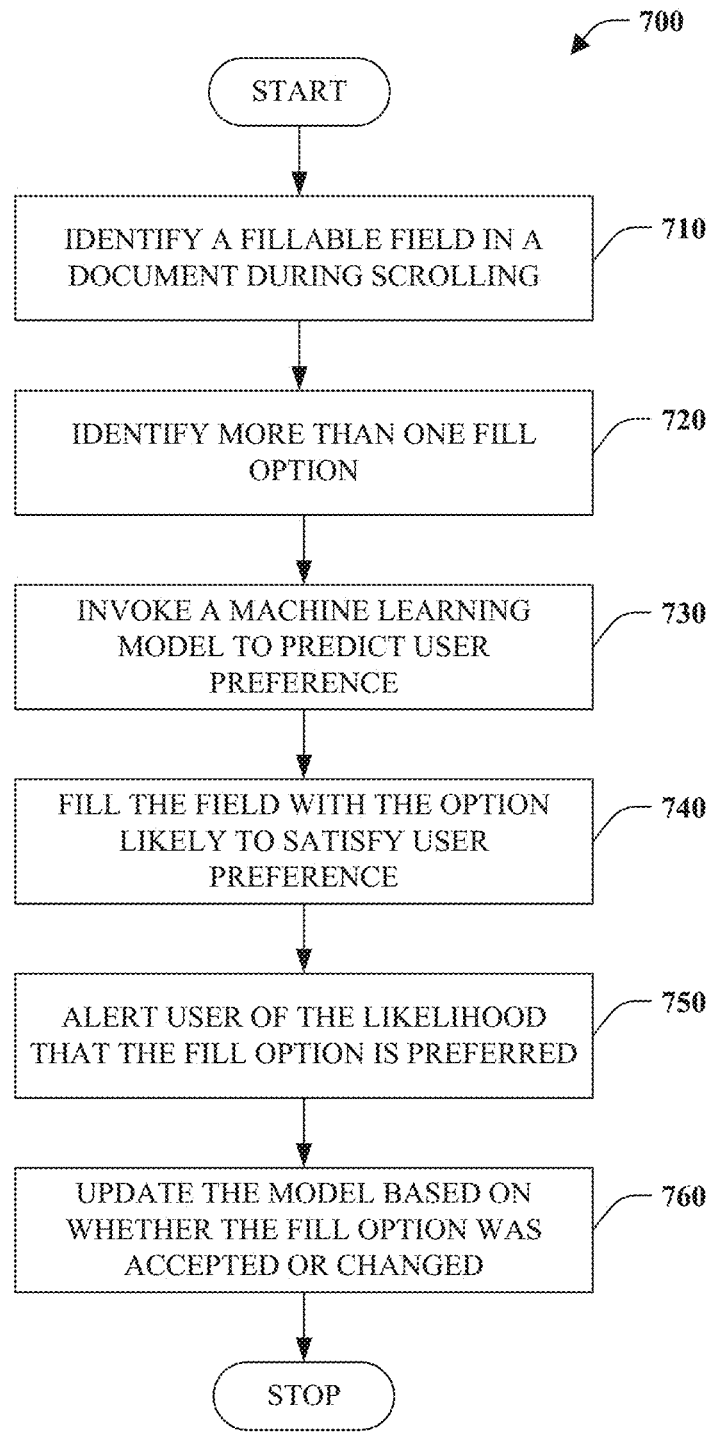
FIG. 7 is a flow chart diagram of scroll-based automatic field completion with uncertainty.

In view of the example systems described above, methods that may be implemented in accordance with the disclosed subject matter will be better appreciated with reference to flow chart diagrams of FIGS. 5-7. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 5, a method 500 of scroll-based automatic field completion is illustrated. The method 500 can be executed by the scroll autofill system 100.

At reference numeral 510, document scrolling is detected. More specifically, a scroll down can be detected. In one instance, the document can correspond to a web page displayed by a web browser. Scrolling involves movement of displayed content in a direction on a display screen that enables viewing of different parts of the content. A scroll down comprises movement downward such that content can be viewed from top to bottom.

At numeral 520, a fillable field is detected. A fillable field can correspond to a form field and can include text boxes and checkboxes, among other things. Content of a document, such as a web page, is monitored to identify displayed content, which can change based on scrolling. The displayed content is analyzed to detect the presence or absence of a fillable field at a predetermined location. The predetermined location can generally correspond to the top, middle, or bottom of a displayed view. Of course, the location can also be between the top and middle, middle and bottom, or a more precise position (e.g., pixels, measured distance . . . ).

At reference numeral 530, the field data type can be identified. In one instance, the field data type can correspond to the type of information solicited by the field. For example, the field data type can correspond to a first name, last name, home address, credit card number, or shipping option, among other things. The field data type can be determined by analyzing the field itself as well as surrounding contextual information. For example, prior to completion, a field may state or suggest the field type within the field itself, such as gray text that indicates name, address, or phone number. Contextual information can also be helpful, including text surrounding a field that indicates contact information, shipping information, payment information as categories, and more text typed closer to a field that may state first name, last name, phone number, or credit card number. Further, source code associated with a presented web page, for example, can be analyzed for further information that helps determine field data type.

At reference 540, field data of the identified field data type is received, retrieved, or otherwise obtained or acquired. A data store, such as a database, can store field data associated with a user in one implementation. Such data can be acquired from the user directly, for example, during a registration process, or indirectly through analysis of user interactions (e.g., previously completed forms). For instance, the data store can be queried for the user's first name, last name, address, or phone number. The response to the query can correspond to the field data.

At reference numeral 550, the detected field is filled or completed with the acquired field data. In one instance, if the field corresponds to a text box, the field data can be entered as text in the box. In another instance, if the field includes a dropdown menu, the menu item that matches the acquired field data can be selected. Further, if the field data corresponds to a check box, the check box can be checked or not based on analysis of the acquired field data. For example, suppose the acquired field box corresponds to ethnicity, and the acquired field data specified white. In that case, the box can be checked if it is associated with white as an ethnicity and otherwise remain unchecked.

FIG. 6 depicts a method 600 of automatic completion and alteration. The method 600 can be performed by the field modification component 408 of the scroll autofill system 100.

At numeral 610, a fillable field in a document is identified during scrolling. A user can scroll through a document to view content using a scroll bar. Such scrolling can be termed a scroll down or down scroll when it starts from the beginning or top of the document and moves toward the end or bottom of the document. As the user scrolls, content can change and be repositioned on a display. The viewable area of the display can be monitored and configured to detect a fillable field.

At reference numeral 620, candidate fill options for the fillable field are identified or otherwise determined or inferred. In one instance, solely a single fill option is available, such as a name or identification number (e.g., social security number). In other instances, there may be more than one candidate fill option. For example, there can be multiple addresses (e.g., home, vacation, business . . . ), phone numbers (e.g., home, office, mobile . . . ), and credit card numbers.

At numeral 630, the field is filled with a first candidate option of the candidate fill options. For example, the field type can be address, and the candidate fill options can be a home address, a vacation home address, or a business address. In this instance, one of the candidate fill options can be selected as the first candidate option, such as the home address. The home address can then be entered into a text box field.

At reference numeral 640, a determination is made as to whether a scroll up has been detected. A scroll up is a movement of content from the bottom or end of the document toward the beginning or top of the document and is the opposite of a scroll down. In one instance, the scroll up is detected within a predetermined time after the scroll down and proximate to the field that was filled with the first candidate option. A scroll up following a scroll down can indicate that a user does not agree or consent to the first candidate fill option. If a scroll up is not detected ("NO"), the method 600 can terminate. If a scroll up is detected ("YES"), the method continues at reference numeral 650.

At reference numeral 650, the first candidate fill option is replaced with a second candidate fill option. In this manner, a scroll up triggers a change in the fill of a field. In accordance with one implementation, a single action of scrolling up can trigger a change in the field. In another embodiment, the scroll-up action can trigger a removal of the first candidate fill option with a scroll down subsequently completing the field with the second candidate fill option.

FIG. 7 illustrates a method 700 of scroll-based automatic field completion in the presence of uncertainty. The method 700 can be performed by the scroll autofill system 100 and, more specifically, the fill component 208.

At reference numeral 710, a fillable field is identified in conjunction with document scrolling. The document can be a web form or page comprising one or more fillable fields in one instance. Fillable fields are areas that accept input from a user that are often used in forms. The fields can take a variety of forms, including a text box and checkbox. The viewable area of a document can be monitored and analyzed to detect the presence of a fillable field.

At numeral 720, more than one fill option is identified for the identified field. For example, multiple addresses can be available, such as home, vacation, and work, or several shipping options can be provided, such as standard ground or next day air.

At reference numeral 730, a machine learning model is invoked to predict a user preference. More particularly, the user preference relates to the multiple fill options the user is likely to prefer. The model can be trained based on historical interaction with forms and any available context information (e.g., user schedule, time of year, type of product . . . ). For example, the model might predict that the vacation address is the preferred address given the date and past orders sent to the vacation home address. The model can thus solve a classification problem where the multiple addresses, namely home, vacation, and work are the classes. Further, the model can compute a probability or likelihood measure, such as a confidence percentage, of each available option. One may be more likely to satisfy a user preference than another.

At reference numeral 740, the field is filled with the option predicted to most likely satisfy a user preference. In other words, one of the more than one fill options is identified based on the likelihood that the option will satisfy a user and is used to fill or complete the corresponding field automatically.

At numeral 750, a user alert is generated that includes the likelihood that the fill option is preferred. For example, a circle with a percentage can be generated and overlayed on a document proximate to the field to which it pertains. In this manner, a user is alerted that there was some uncertainty due to multiple fill options, and the option selected was predicted by the system to be what the user would have entered with a certain level of confidence. The user alert can thus invite an additional level of scrutiny to the field completion.

At reference numeral 760, a determination is made as to whether or not the user consented or agreed with the fill option or initiated actions to change the fill option selected. The result of the determination is subsequently utilized to update the machine learning model for future operations, thereby allowing the model to learn and improve with experience.

The subject disclosure pertains to the technical problem of electronic form completion. The technical solution includes triggering automatic completion of form fields in response to scrolling. Information can be collected regarding a user and utilized to fill in form fields. As a user scrolls down a form from top to bottom, fields can be identified and automatically filled. In one instance, machine learning can be invoked to infer or predict user data for a field when multiple options exist for filling the field. Further, a scroll-up action after a field is complete can be utilized to trigger filling with alternate data.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
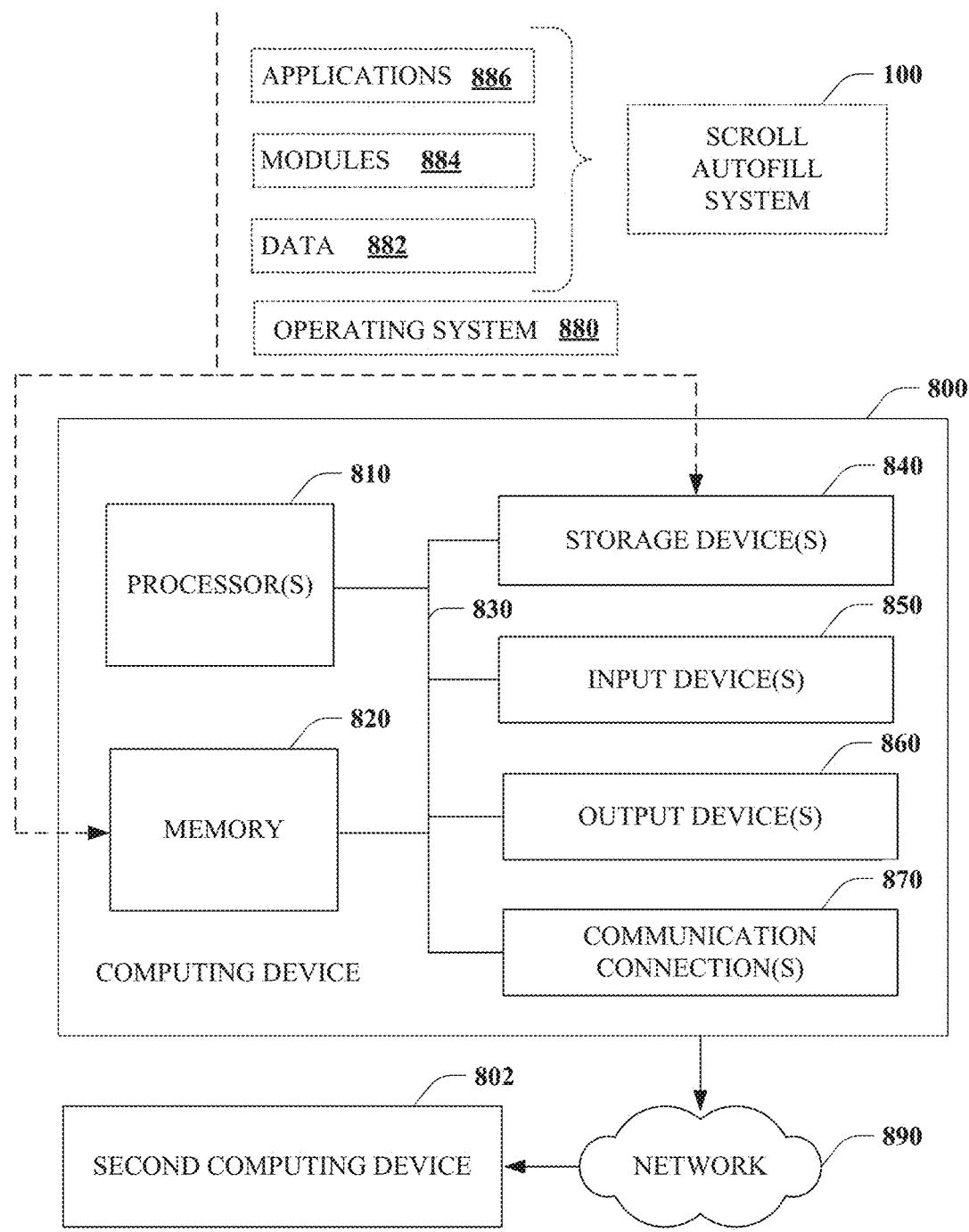
FIG. 8 is a block diagram illustrating a suitable operating environment for aspects of the subject disclosure.

To provide a context for the disclosed subject matter, FIG. 8, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node, . . . ). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming and/or engineering techniques to produce software, firmware, hardware, or any combination thereof to control the computing device 800 to realize the disclosed functionality. By way of example and not limitation, all, or portions of the scroll autofill system 100 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the scroll autofill system 100 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth, . . . ), or a combination thereof.

The computing device 800 can also include communication connection(s) 870 to enable communication with at least a second computing device 802 utilizing a network 890. The communication connection(s) 870 can include wired or wireless communication mechanisms to support network communication. The network 890 can correspond to a local area network (LAN) or a wide area network (WAN) such as the Internet. The second computing device 802 can be another processor-based device with which the computing device 800 can interact. In one instance, the computing device 800 can execute the scroll autofill system 100 or portions thereof remotely as a network-accessible service. The second computing device 802 can correspond to a user device employed by a user to access and interact with a document such as a web page through a web browser. The web browser can then invoke the scroll autofill system 100 as a service.

What has been described above includes examples of aspects of the claimed subject matter. It is, of course, not possible to describe every conceivable combination of components or methodologies for purposes of describing the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for performing scroll-triggered field completion, comprising:
one or more processors coupled to one or more memory that includes instructions that, when executed by the one or more processors, cause the one or more processors to:
monitor display of a page by a web browser to identify a field of the page not initially within a viewable area;
prepare a first candidate completion value and a second candidate completion value for the field before the field is in the viewable area;
detect a first request to scroll in a first direction past a location on the page while detecting the field at the location via the monitoring of the display, wherein the field is initially an empty field;
trigger a first automatic completion of the field in response to the first request to scroll in the first direction through the location, wherein triggering the first automatic completion of the field comprises completing the field with the first candidate completion value while the field is in the viewable area;
detect a second request to scroll in a second direction opposite to the first direction from the location of the field on the page; and
trigger a second automatic completion of the field with the second candidate completion value in response to receiving the second request from the location of the field on the page.

2. The system of claim 1, wherein the instructions further cause the one or more processors to trigger the first automatic completion when the field is in a middle of the page displayed.

3. The system of claim 1, wherein the instructions further cause the one or more processors to trigger the first automatic completion when the field is displayed between a top and a middle of the page.

4. The system of claim 1, wherein the instructions further cause the one or more processors to analyze the empty field and determine a type of data.

5. The system of claim 4, wherein the instructions further cause the one or more processors to retrieve data of the type requested from a data store.

6. The system of claim 5, wherein the instructions further cause the one or more processors to invoke a machine learning model to infer a preference for data when there are multiple data options to complete the empty field.

7. The system of claim 6, wherein the instructions further cause the one or more processors to compute and return a confidence value associated with data that completes the empty field.

8. The system of claim 1, wherein the instructions further cause the one or more processors to trigger the second automatic completion of the field within a predetermined time from when the field was completed after trigger the first automatic completion of the field.

9. A method, comprising:
monitoring display of a page by a web browser to identify a field of the page not initially within a viewable area;
preparing a first candidate completion value and a second candidate completion value for the field before the field is in the viewable area;
detecting a first request to scroll in a first direction past a location on the page while detecting a field at the location via the monitoring of the display;
triggering a first automatic fill of the field in response to the first request to scroll in the first direction through the location, wherein triggering the first automatic fill of the field comprises filling the field with the first candidate completion value while the field is in the viewable area;

detecting a second request to scroll in a second direction opposite to the first direction from the location of the field on the page; and triggering a second automatic fill of the field with the second candidate completion value in response to the second request from the location of the field on the page.

10. The method of claim 9, further comprising presenting different refill options for selection by a user in response to the second request to scroll in the second direction.

11. The method of claim 9, further comprising analyzing the field and determining a type of data solicited.

12. The method of claim 11, further comprising:

invoking a machine learning model to infer a preference for data when there are multiple data options to complete the field; and filling the field with one of the multiple data options based on the preference.

13. A method of automatic field completion, comprising:

executing, on one or more processors, instructions that cause the one or more processors to perform operations, the operations comprising:

identifying a field at a location not initially displayed within a viewable area on a page by a web browser;

preparing a first candidate completion value and a second candidate completion value for the field before the field is in the viewable area;

in response to a first request in a first direction through the location, filling the field by:

determining a type of data associated with the field;

retrieving the first candidate completion value based on the type;

automatically filling the field with the first candidate completion value, by filling the field with the first candidate completion value while the field is in the viewable area;

detecting a second request to scroll in a second direction opposite to the first direction from the location of the field on the page; and automatically refilling the field with the second candidate completion value in response to the second request from the location of the field on the page.

14. The method of claim 13, wherein the operations further comprise:

invoking a machine learning model to infer a user preference when multiple user data options are available; and automatically filling the field with one of the multiple user data options based on the user preference.

15. The method of claim 14, where the operations further comprise:

determining a level of confidence associated with the first candidate completion value; and rendering the level of confidence on the page associated with the field.

16. The method of claim 13, further comprising presenting different refill options for selection by a user in response to the second request.

17. The method of claim 13, wherein the location of the field is between a top and a middle of the page.

18. The method of claim 13, wherein the field is initially an empty field, and wherein determining the type of data comprises analyzing the empty field to determine the type of data.

19. The method of claim 13, wherein the field is initially an empty field, further comprising invoking a machine learning model to infer a preference for data when there are multiple data options to complete the empty field.

20. The method of claim 13, wherein the field becomes a completed field after the filling of the field with the first candidate completion value, and wherein automatically refilling the field comprises automatic refilling the completed field within a predetermined time from when the field was completed.

* * * * *